United States Patent [19]

Hills

[11] Patent Number: 4,620,250

[45] Date of Patent: Oct. 28, 1986

[54] TRANSDUCER-TO-MEDIUM STABILIZING DEVICE AT NEGATIVE ATTACK ANGLE WITH RESPECT TO MEDIUM

[75] Inventor: Robert G. Hills, Spencerport, N.Y.

[73] Assignee: Eastman Kodak Company, Rochester, N.Y.

[21] Appl. No.: 594,657

[22] Filed: Mar. 29, 1984

[51] Int. Cl.[4] .................. G11B 5/016; G11B 5/60; G11B 5/48; G11B 23/03

[52] U.S. Cl. ............................ 360/102; 360/99; 360/104; 360/133

[58] Field of Search ............... 360/97, 99, 102, 103, 360/130.34, 104, 133

[56] References Cited

U.S. PATENT DOCUMENTS

| | | | |
|---|---|---|---|
| 3,657,710 | 4/1972 | Billawala | 340/174.1 E |
| 3,678,482 | 7/1972 | Billawala | 340/174.1 E |
| 3,821,813 | 6/1974 | Freeman et al. | 360/103 |
| 3,872,507 | 3/1975 | Sano et al. | 360/102 |
| 4,214,287 | 7/1980 | Stromsta et al | 360/103 |
| 4,375,656 | 3/1983 | Radman, Jr. et al. | 360/102 |

FOREIGN PATENT DOCUMENTS

| | | | |
|---|---|---|---|
| 54-107322 | 8/1979 | Japan | 360/102 |
| 0177558 | 10/1983 | Japan | 360/103 |

Primary Examiner—Robert S. Tupper
Assistant Examiner—Melissa J. Koval
Attorney, Agent, or Firm—Roger A. Fields

[57] ABSTRACT

In a head-to-disk stabilizing unit of a recording and/or reproducing apparatus, a flat air bearing surface surrounds an elongate opening to a negative pressure cavity. A record and/or playback head is arranged in the cavity with its transducer means (e.g., a magnetic gap) disposed at the opening in substantially coplanar relation with the air bearing surface. If a flexible magnetic disk is rotated at a relatively high speed to move successive portions of the disk over the air bearing surface, the surface will stabilize each portion of the rotated disk by damping out any flutter before a negative pressure formed in the cavity pulls the disk portion substantially into contact with the transducer means, thereby ensuring a constant and intimate transducer-to-disk magnetic coupling. The air bearing surface is disposed at a negative attack angle with respect to the rotated disk to cause the formation of a Bernoulli pull down force along such surface, which enhances disk stabilization over the surface and disk pull down at the cavity opening. In a preferred embodiment, a leading curved edge of the air bearing surface penetrates into the rotated disk to choke off the flow of moving air over the surface, to facilitate the formation of the pull down force.

5 Claims, 9 Drawing Figures

TRANSDUCER-TO-MEDIUM STABILIZING DEVICE AT NEGATIVE ATTACK ANGLE WITH RESPECT TO MEDIUM

CROSS REFERENCE TO A RELATED APPLICATION

Reference is made to commonly assigned, copending patent application Ser. No. 583,558, now U.S. Pat. No. 4,578,727, filed Feb. 27, 1984, in the name of Robert G. C. Hills and entitled Magnetic Recording and/or Reproducing Apparatus.

BACKGROUND OF THE INVENTION

1. Field of the Invention

The invention generally relates to a magnetic recording and/or reproducing apparatus for use with a flexible storage medium, such as a magnetic disk. More particularly, the invention relates to apparatus that provides a stable, i.e., substantially constant, transducer-to-medium relation for enhancing the recording or reproducing of information on the flexible medium.

2. Description of the Prior Art

Magnetic recording and/or reproducing may be divided into two general techniques. The first one is a "non-contacting" technique in which the storage medium, often a magnetic disk, and the transducer remain slightly spaced apart by a layer of air. The second one is a "contacting" technique in which the storage medium, often a magnetic tape, and the transducer are substantially in physical contact. For successfully recording or reproducing information on a magnetic medium, using either type of technique, particularly at high densities such as employed in a video recorder or computer equipment, the transducer-to-medium relation should remain constant over a wide range of operating parameters. Variations in the transducer-to-medium relation can have a significant effect on the fringing flux pattern and, therefore, the resolution of the sensing and recording of information on the magnetic medium. Unfortunately, with a magnetic medium, especially one that is flexible, as for example a floppy disk, the transducer-to-medium relation may be varied by the interaction of many parameters, such as temperature, humidity, relative speed between the medium and the transducer, penetration of the transducer into the medium, the contour of surface areas surrounding the transducer, flexibility and variations in thickness of the medium, the angles of attack and tilt of the transducer with respect to the medium, etc.

Various non-contacting type recording and/or reproducing apparatus have been proposed which seek to ensure a substantially constant spacing between a flexible magnetic disk and a magnetic head. For example, in U.S. Pat. No. 3,178,719, a flexible magnetic disk initially in close proximity (e.g., 0.005"–0.010") to a flat air bearing surface of an annular plate, usually referred to as a Bernoulli plate, is rotated at a relatively fast speed, which causes the rotated disk to assume a stable position at a small distance from the air bearing surface. It is believed that the stable position results from a balance of centrifugal and Bernoulli forces that causes the rotated disk to reach a condition of equilibrium closely spaced from the air bearing surface. A plurality of magnetic heads, radially disposed with respect to the rotated disk, are embedded in the Bernoulli plate, either slightly above or slightly below (e.g., 0.002") or flush with the air bearing surface. Since the close spacing between the air bearing surface and the rotated disk, and therefore the critical spacing between the magnetic heads and the rotated disk, varies as a function of the disk radius, a vacuum pump is included to create a partial vacuum in respective round openings in the plate, which each contain one of the heads. The partial vacuum deforms small annular areas of the flexible disk around the magnetic heads to independently control the close spacing between each one of the heads and localized portions of the disk.

Although the non-contacting recording apparatus disclosed in U.S. Pat. No. 3,178,719 may perform satisfactorily, it requires the use of a vacuum pump to control the critical head-to-disk spacing, which increases the construction and operating costs of such apparatus. A simpler non-contacting recording apparatus that dispenses with the need for a vacuum pump is disclosed in U.S. Pat. No. 4,074,330. In that apparatus, an annular (Bernoulli) plate has a groove which is sealed at its ends, is open to a flexible disk, and is radially disposed with respect to the disk. A magnetic head, movable along the groove, projects from the groove to a location slightly above a flat air bearing surface of the plate facing the disk, to penetrate into the disk. Bracketing the groove, on either side of the head, is a pair of up-stream and down-stream convex surfaces which are radially coextensive with the groove. The respective apexes of the two convex surfaces are located closer to the flat air bearing surface of the plate than to the radially extending sides of the groove. With this arrangement, it is purported that the amount of air carried by the rotated disk out of the groove is greater than the amount of air carried by such disk into the groove. The net result is to exhaust air from the groove, which generates a Bernoulli pull down force on the rotated disk over the groove. Such pull down force is opposite to the tendency of the rotated disk to dimple away from the magnetic head because of penetration of the head into the disk, and therefore ensures a stable close spacing between the head and the disk.

The flat air bearing surfaces of the Bernoulli plates in the '719 and '330 patents, as well as in other non-contacting recording apparatus, such as disclosed in U.S. Pat. No. 4,003,091, are larger than the flexible disks with which they are used. This arrangement makes it impossible for such an air bearing surface to penetrate into a flexible disk jointly with a magnetic head, which prevents use of the apparatus in certain instances, for example with a disk that is housed in a cartridge. Moreover, the round vacuum-supplied opening in the '719 patent for deforming a flexible disk about a magnetic head, and the convex surfaces in the '330 and '091 patents for effecting pull down of a flexible disk against a magnetic head, are of respective configurations that may deform the flexible disk to such an extent that its useful life may be shortened.

When a flexible magnetic disk is housed in a cartridge, the situation becomes even more critical because the stability of the head-to-disk relation may be affected by certain surfaces of the cartridge proximate the rotated disk. Therefore, to ensure a stable head-to-disk relation in a disk cartridge it has been proposed to have the head contact the disk, as disclosed in U.K. Patent Application GB No. 2,101,391A, published Jan. 12, 1983 and in *IEEE Transactions on Consumer Electronics*, Vol. CE-28, No. 3, Aug. 1982, p. 326. In that example, the disk cartridge includes an opposed pair of openings which extend radially on either side of the magnetic disk. As the flexible disk is rotated, a magnetic head is moved along one of the openings in the nominal plane of the disk to penetrate the disk, and a guide plate in the other opening limits the tendency of the rotated disk to lift off the magnetic head. Use of the guide plate ensures a stable, intimate head-to-disk contact. Without the guide plate, the head-to-disk relation becomes unstable and may vary to the extent that the signal-to-noise ratio will be unacceptable.

While such use of a guide plate with a magnetic head for achieving a stable head-to-disk contact in a cartridge may perform satisfactorily, the spacing between the head and the guide plate is especially critical, and therefore can be a problem. If the spacing is too small, the disk and the head will become degraded rather quickly by wear of the one against the other. If the spacing is too large, the head-to-disk relation will become unstable. As a result, the prior art has required that relatively expensive means be employed to establish such spacing and to maintain it with some degree of assurance, particularly after extended use of the head and the guide plate.

The Referenced Application

The application, cross-referenced above, discloses a contacting type recording and/or reproducing apparatus in which a flat air bearing surface surrounds an elongate opening to a negative pressure cavity. A record and/or playback head is arranged in the cavity with its transducer means (e.g., a magnetic gap) disposed at the opening in substantially coplanar relation with the air bearing surface. If a flexible magnetic disk is rotated at a relatively high speed (e.g., 60 revolutions per second) to move successive portions of the disk over the air bearing surface, the surface will stabilize each portion of the rotated disk (by damping out any flutter) before a negative or low pressure formed in the cavity pulls the disk portion substantially into contact with the transducer means, thereby ensuring a constant and intimate transducer-to-disk magnetic coupling.

The elongate opening to the cavity has a shape that is long in proportion to width in a direction tangential to that of rotating the disk, and preferably has a wasp waist or hourglass configuration with a narrow waist disposed proximate the transducer means of the magnetic head, to limit pull down deformation of the disk in the vicinity of the transducer means and to effect the greatest stabilization of the disk (by the air bearing surface) generally at the same location. This arrangement is an improvement over those prior art devices, for example disclosed in U.S. Pat. Nos. 3,178,719 and 4,003,091, in which the pull down means has a round or annular shape to encircle the magnetic head, and therefore causes pull down deformation of the disk to such a degree that the useful life of the disk is shortened. Moreover, the exact shape of the opening to the cavity is not a critical factor as in the instance of the convex surfaces in U.S. Pat. Nos. 4,003,091 and 4,074,330. In those patents, the contour of the convex surfaces and the location of the apex of such surfaces are critical factors in effecting the desired (non-contacting) transducer-to-disk relation.

The air bearing surface is considerably smaller than the disk to permit the surface to penetrate with the transducer into the nominal plane of the disk. Thus, in contrast to the prior art devices in which the Bernoulli plate is larger than the disk, the air bearing surface may be effectively used with a disk that is housed in a cartridge, simply by inserting it (with the transducer) through the radial opening in the cartridge to access the disk.

SUMMARY OF THE INVENTION

The flat air bearing surface in the head-to-disk stabilizing device in the referenced application, as well as the flat air bearing surface of the Bernoulli plate in the above-described prior art devices, is disposed parallel to the nominal plane of the flexible magnetic disk. That is to say, the air bearing surface is disposed at a 0° angle of attack with respect to the rotated disk. My invention improves such head-to-disk stabilizing devices by disposing the air bearing surface at a negative angle of attack with respect to the rotated disk. When, for example, the air bearing surface in the referenced application is disposed at a negative attack angle, a Bernoulli pull down force is formed along the air bearing surface which has been found to enhance disk stabilization along the surface and to enhance disk pull down over the elongate opening to the cavity (containing the head). Specifically, the resulting pull down force causes the rotated disk to move closer to the air bearing surface, which improves stabilization of successive portions of the rotated disk before each portion contacts the transducer means of the head. Moreover, the negative or low pressure in the cavity is increased to provide improved transducer-to-disk contact. Therefore, owing to the invention, a more stable and intimate transducer-to-disk relation is effected.

In a preferred embodiment of the invention, the flat air bearing surface has a leading curved edge located upstream with respect to the direction of rotating the disk and a trailing curved edge located downstream from the leading edge. The air bearing surface is disposed (at a negative attack angle) with its leading edge slightly penetrating (e.g., 0.001"–0.004") into the nominal plane of the disk and its trailing edge spaced from the nominal plane. Such an arrangement causes the leading edge to operate as air scraper means, which chokes off the flow of moving air over the air bearing surface and thereby causes the formation of a Bernoulli pull down force along the surface.

BRIEF DESCRIPTION OF THE DRAWINGS

The invention will be described with respect to the drawings, wherein.

DESCRIPTION OF THE PREFERRED EMBODIMENT

Before proceeding with a description of the preferred embodiment of the invention, it is well to first consider a magnetic disk cartridge with which the preferred embodiment may be used.

Magnetic Disk Cartridge

Figure 1:
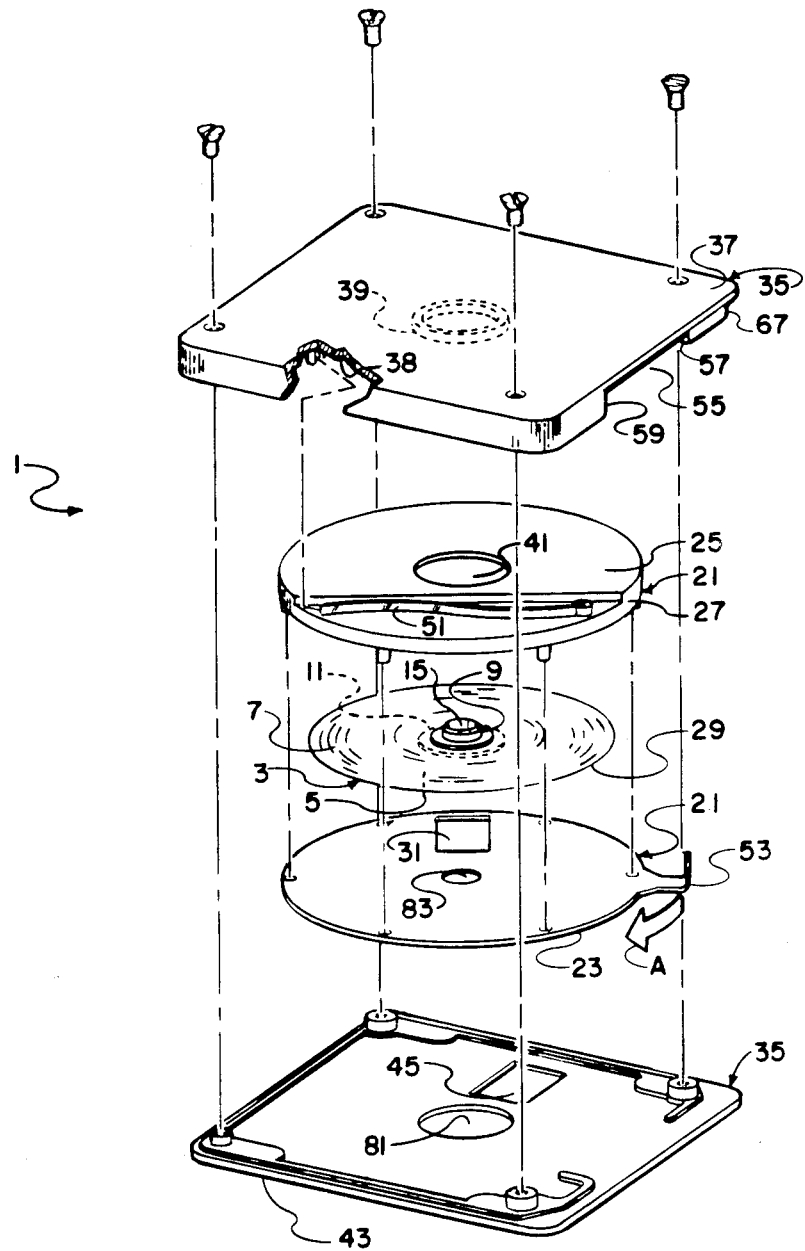
FIG. 1 is an exploded perspective view of a magnetic disk cartridge.
Figure 3:
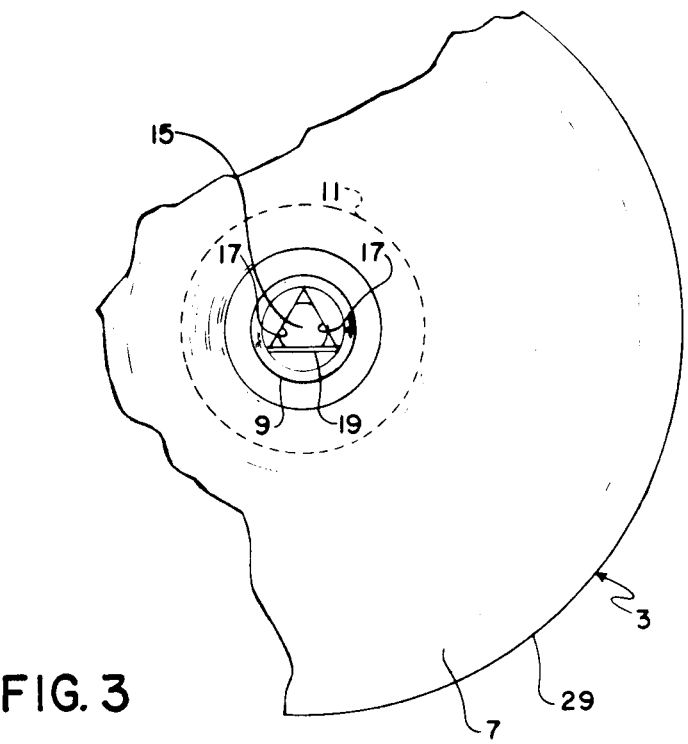
FIG. 3 is a plan view of the hub configuration of a flexible magnetic disk in the cartridge.
Figure 2:
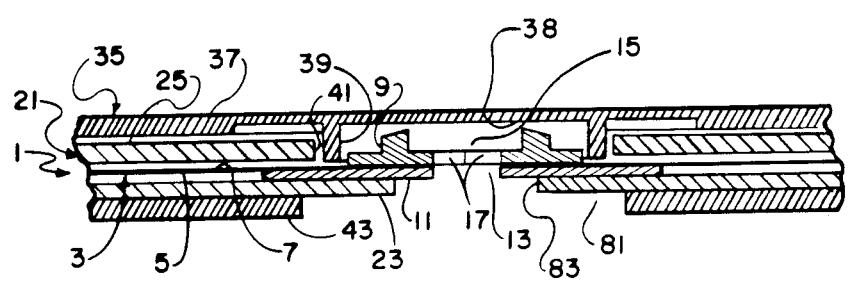
FIG. 2 is a partial sectional view of a central portion of the disk cartridge.

Referring now to the drawings, FIGS. 1 and 2 show a magnetic disk cartridge 1 intended for use in a disk recording and/or reproducing apparatus. The cartridge 1 includes a flexible disk 3 (e.g., a floppy disk) having a planar magnetic-coated surface 5 for storing information signals and a planar non-magnetic support surface 7. A rotation hub 9 and an annular element 11, coaxially arranged with respect to a central hole 13 in the disk 3, are fixed to the respective support and magnetic surfaces 7 and 5 of the disk, as shown in FIG. 2. The hub 9 has a hole 15 for receiving a drive shaft in the recording and/or reproducing apparatus to rotate the disk 3. A pair of angled positioning edges 17, shown in FIG. 3, are arranged within the hole 15 in the hub 9 to tangentially contact the circular periphery of the drive shaft, thereby centering the disk 3 relative to the axis of the drive shaft. A resilient chordal element 19 extends across the hole 15, spaced from the two angled positioning edges 17, to hold the drive shaft firmly against both of the positioning edges.

A rigid protective envelope 21 is provided to enclose the flexible disk 3 in a cylindrically-shaped chamber, though the envelope is dimensioned to allow the disk to freely rotate within the chamber. As shown in FIGS. 1 and 2, the envelope 21 includes a pair of substantially parallel, circular-shaped face walls 23 and 25, each having a similar size diameter which is slightly larger than the diameter of the disk 3. The two face walls 23 and 25 generally cover the respective magnetic and support surfaces 5 and 7 of the disk 3, but they are slightly spaced from such surfaces. A continuous side wall 27 of the envelope 21, encircling the circumferential edge 29 of the disk 3, connects the face walls 23 and 25, as shown in FIG. 1. The face wall 23 has a rectangular-shaped opening 31 which is arranged radially with respect to the disk 3 to provide limited radial access to the magnetic surface 5, for a magnetic head in the recording and/or reproducing apparatus. The access opening 31 radially extends lengthwise at least to separate locations opposite the inner and outer effective limits of the annular recording area on the magnetic surface 5.

A rigid rectangular-shaped housing 35 encloses the envelope 21 and is dimensioned to allow the envelope to rotate within the housing. As viewed in FIGS. 1 and 2, a top wall 37 of the housing 35 includes, on its inside surface 38, an integrally formed, centered, tubular-like member 39. The tubular-like member 39 extends into a central opening 41 in the face wall 25 of the envelope 21 to support the envelope for rotation relative to the housing 35 substantially about the same axis as that of the disk 3. The rotation hub 9 of the disk 3 is located within the tubular-like member 39 to loosely support the disk for rotation.

A bottom wall 43 of the housing 35, as viewed in FIG. 1, has a rectangular-shaped opening 45 which is normally out of registration with the access opening 31 in the face wall 23 of the envelope 21, in order for the opening 45 to be closed by the face wall. The opening 45 corresponds substantially in size and arrangement to the opening 31. For example, the opening 45 is arranged radially with respect to the disk 3 in the same way that the opening 31 is radially arranged with respect to the disk. A return spring 51 has one end fixed to the face wall 25 of the envelope 21 and another end fixed to the inside surface 38 of the top wall 37 of the housing 35. A tab 53, integrally formed with the face wall 23 of the envelope 21, extends through a side slot 55 in the housing 35. The return spring 51 ordinarily maintains the opening 31 in the envelope 21 displaced from the opening 45 in the housing 35 by urging the envelope to rotate in a direction opposite to that indicated by the arrow A until the tab 53 is abutted against a stop 57 at one end of the side slot 55. When the tab 53 is moved in the direction of the arrow A until it abuts against a stop 59 at the other end of the side slot 55, the envelope 21 will be rotated in the same direction to position the opening 31 substantially in registration with the opening 45. Then, a magnetic head may be admitted through such pair of registered openings 31 and 45 to the magnetic surface 5 of the disk 3.

The cartridge 1 includes the envelope 21 within the housing 35 for twice enclosing the flexible disk 3 to prevent dust and other contaminants from reaching its sensitive magnetic surface 5 and to provide a rigid interior enclosure for the flexible disk, which supplements the rigid housing in protecting the fragile disk from being folded or otherwise damaged.

Magnetic Recording and/or Reproducing Apparatus

Figure 4:
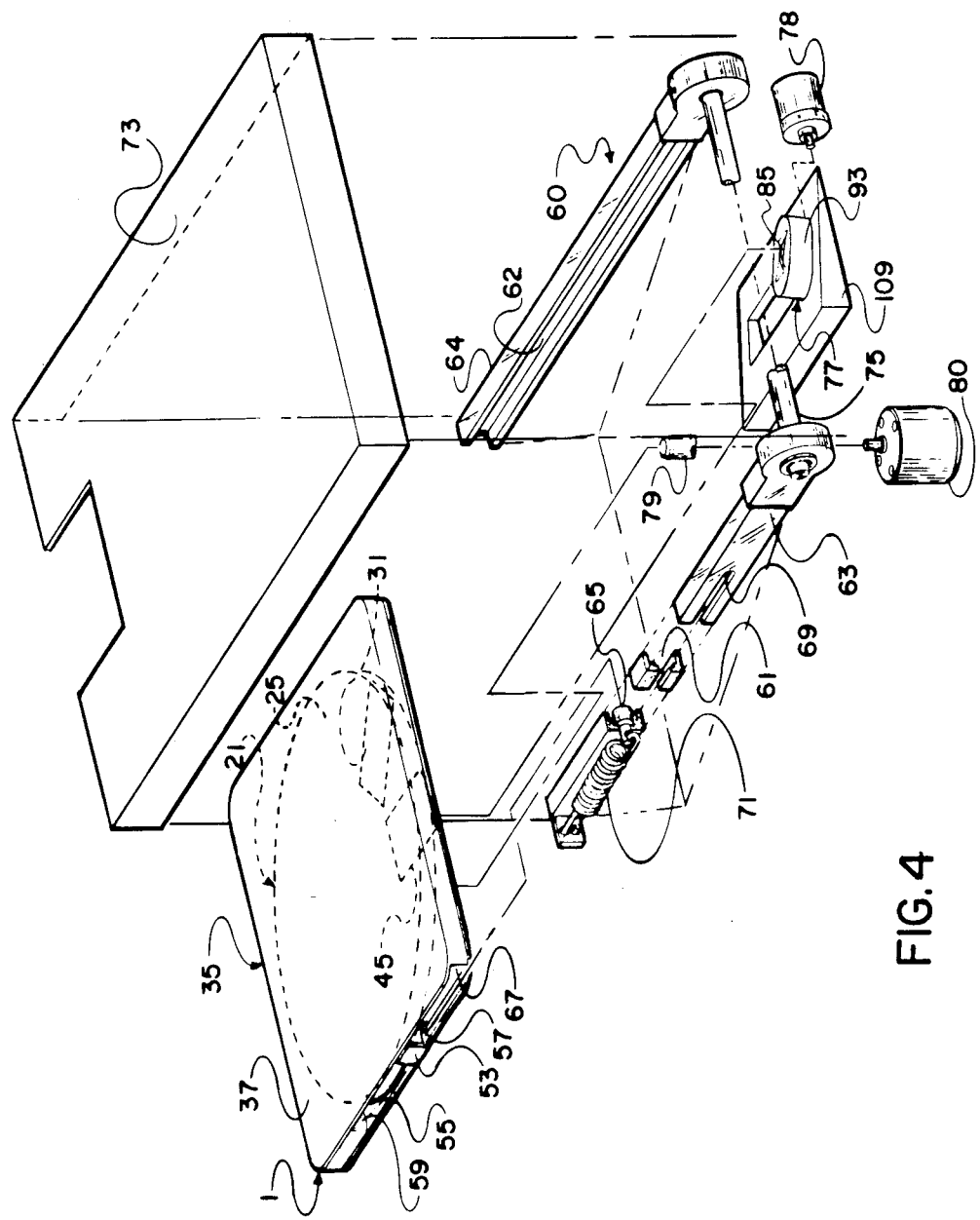
FIG. 4 is a schematic perspective view of the disk cartridge and a cartridge-loading disk drive assembly in a magnetic recording and/or reproducing apparatus.

FIG. 4 shows the manner in which the disk cartridge 1 may be inserted into a cartridge-loading disk drive assembly 60 of a magnetic recording and/or reproducing apparatus. When the cartridge 1 is slid into a pair of substantially parallel, u-shaped channels 61 and 62 defined by respective arms 63 and 64, a boss 65 located in the channel 61 will first enter a guide groove 67 in the housing 35 and will then swing the tab 53 along the side slot 55 in the housing from the stop 57 to the stop 59. Thereupon, the envelope 21 will be rotated relative to the housing 35 to position the opening 31 in the envelope substantially in registration with the opening 45 in the housing, to provide limited radial access to the magnetic surface 5 of the disk 3. With continued movement of the cartridge 1 into the channels 61 and 62, the tab 53 (against the stop 59) will slide the boss 65 along a support slot 69 in the arm 63 in opposition to the urging of a return spring 71. Then, upon completed movement of the cartridge 1 into the channels 61 and 62, releasable means, not shown, may be manually operated to secure the cartridge in place.

When an assembly cover 73 atop the arms 63 and 64 is pushed downward, as viewed in FIG. 4, with the cartridge 1 secured in place, the cover (as well as the arms and the cartridge) will pivot about a supporting rod 75 until the cartridge comes to rest in a horizontal position against stop means, not shown. As the cover 73 is pushed downward, a head-to-disk stabilizing unit 77, movable radially with respect to the disk 3 by a stepping motor 78, will be received in the pair of registered openings 31 and 45 to access the magnetic surface 5 of the disk, and a drive spindle 79 rotated by a motor 80 will be received in the hole 15 in the hub 9 of the disk to rotate the disk. As shown in FIG. 1, the bottom wall 43 of the housing 35 and the face wall 23 of the envelope 21 have respective central openings 81 and 83 for admitting the drive spindle 79 into the hole 15 in the hub 9 to rotate the disk 3.

Figure 5:
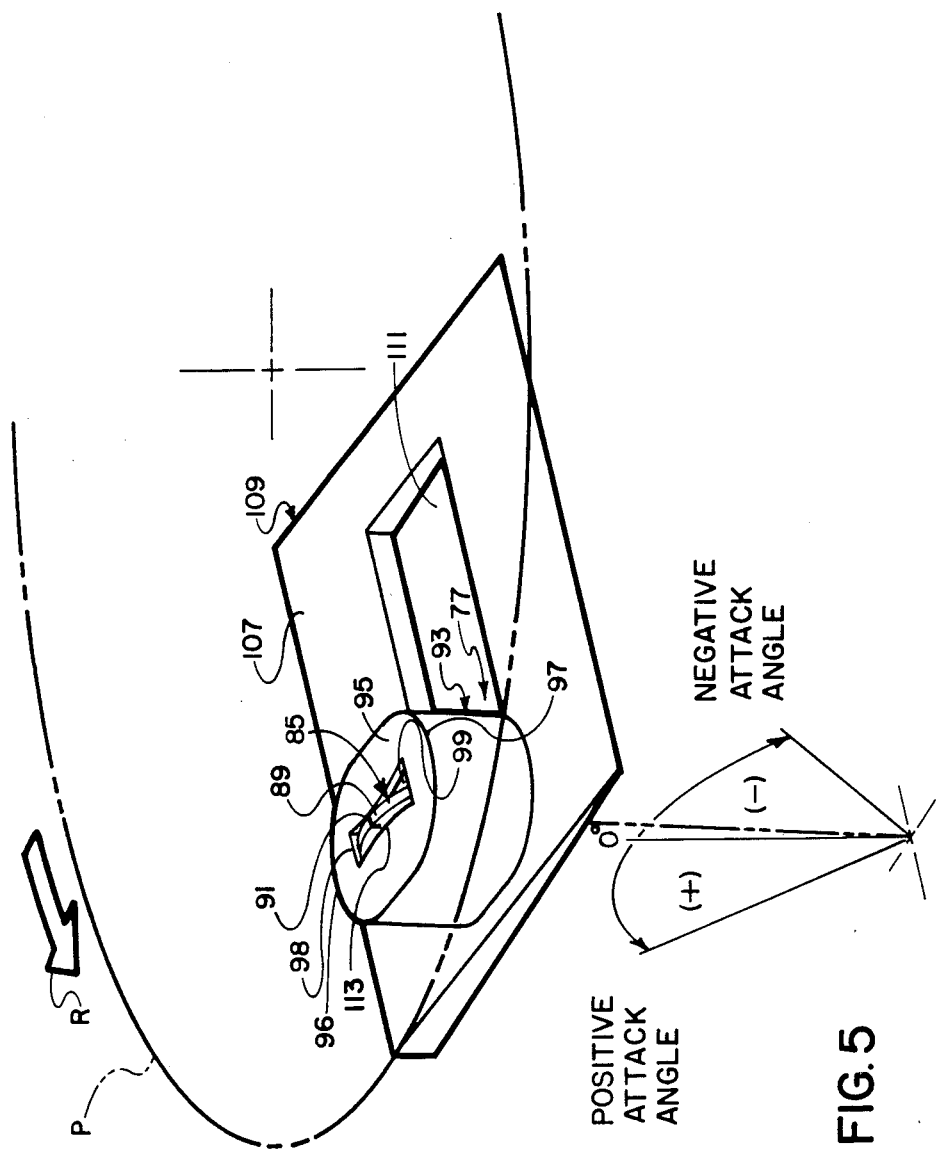
FIG. 5 is a schematic perspective view of an improved head-to-disk stabilizing unit in the disk drive assembly, showing such unit disposed at a negative angle of attack with respect to the nominal plane of the magnetic disk, according to a preferred embodiment of the invention.
Figure 6:
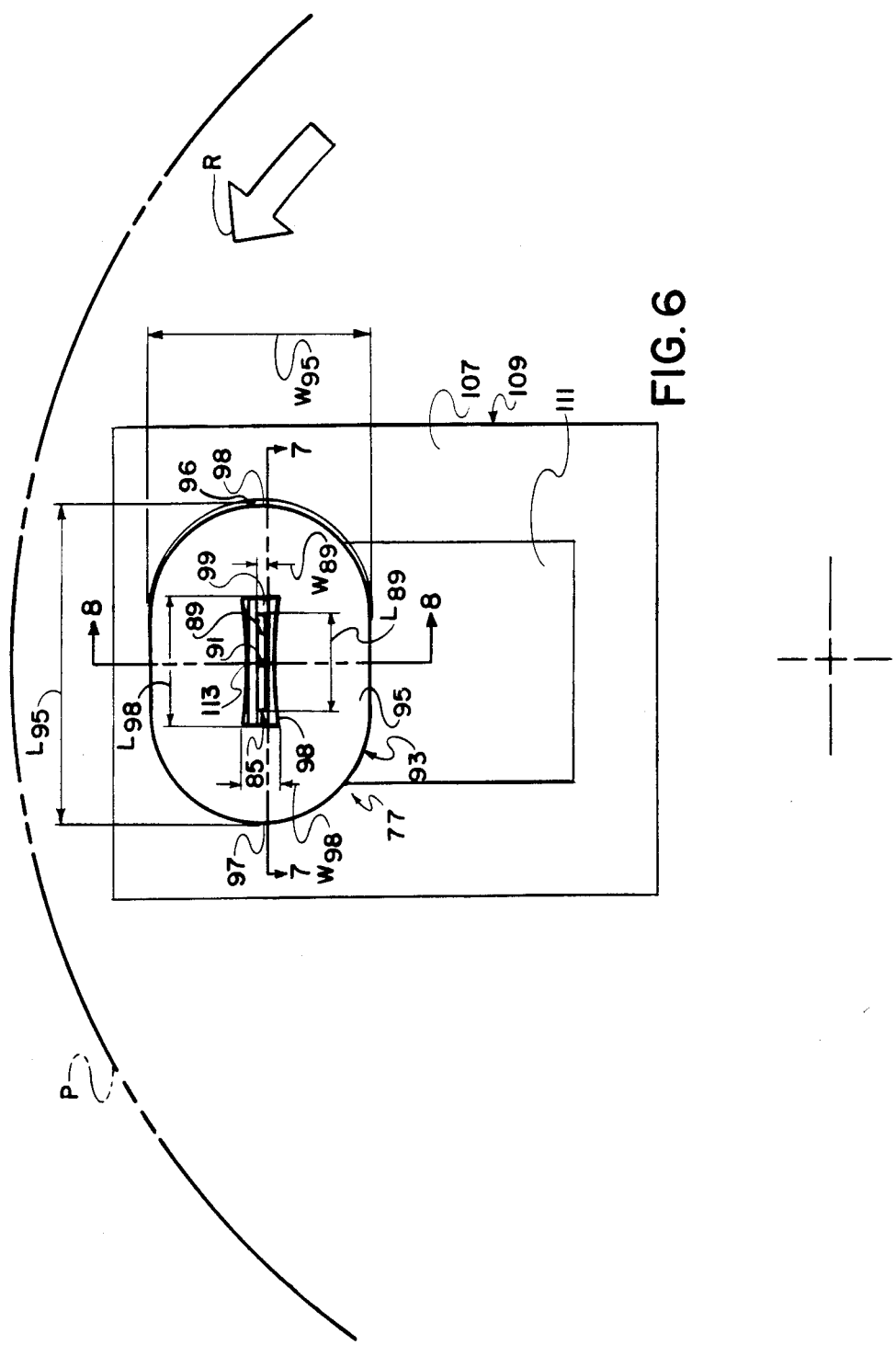
FIG. 6 is a top plan view of the head-to-disk stabilizing unit.
Figure 7:
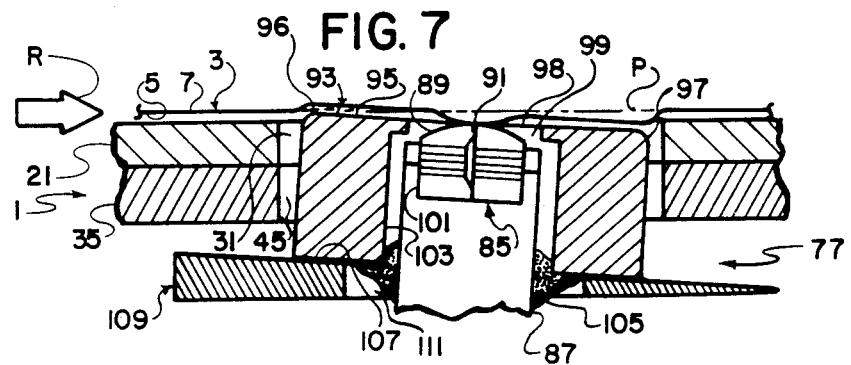
FIG. 7 is a sectional view of the head-to-disk stabilizing unit (received in an access opening in the disk cartridge) as seen in the direction of the arrows from the lines 7—7 in FIG. 6.

Details of the head-to-disk stabilizing unit 77 are shown in FIGS. 5, 6, 7, and 8. The illustrated head is a magnetic recording or playback head 85 having one end fixed to a non-magnetic shoe 87 and the other end forming an operating surface 89, which is the surface that contacts the magnetic surface 5 of the disk 3. As shown in FIGS. 6 and 7, respectively, the operating surface 89 has a length and a width $L_{89}$, $W_{89}$, and a contour that is convex. The length $L_{89}$ is long in proportion to the width $W_{89}$ in a direction tangential to that of rotating the disk 3. The direction of disk rotation is indicated by the arrow R in FIGS. 5–7. A transducer means, such as a magnetic gap 91, or a thin film element, not shown, is located in the operating surface 89 for coacting with the magnetic surface 5 of the disk 3 to record or playback information signals on the disk surface.

The typical dimensions of the operating surface 89 of a record head are as follows:
  Length $L_{89}$ is 0.118";
  Width $W_{89}$ is 0.0024";
  Radius is 0.40"; and
  Gap 91 is 0.000018".

The typical dimensions of the operating surface 89 of a playback head would be the same, except as follows:
  Width $W_{89}$ is 0.0016"; and
  Gap 91 is 0.000012".

A non-magnetic stabilizer block 93 includes a flat, highly polished, air bearing surface 95 having a leading curved edge 96 located upstream with respect to the direction R of rotating the disk 3 and a trailing curved edge 97 located downstream from the leading edge, as shown in FIGS. 5–7. The air bearing surface 95 is dimensioned to permit it to be received through the pair of registered openings 31 and 45 in the envelope 21 and the housing 35 of the cartridge 1. When used with the disk 3, which has a diameter of 1.85", the length $L_{95}$ and the width $W_{95}$ of the air bearing surface 95 may be 0.350" and 0.250", respectively. Of course, other dimensions are possible in accordance with the size of the disk that is used. The air bearing surface 95 of the stabilizer block 93 surrounds an elongate opening 98 to a negative pressure cavity 99 in the block. The cavity 99 contains the magnetic head 85, which is disposed in the cavity with its respective sides 101 spaced from the steep walls 103 of the cavity. As shown in FIGS. 6 and 7, the cavity 99 is defined by a hole in the block 93 that is sealed at an end remote from the elongate opening 97 by a non-magnetic potting compound 105, such as epoxy. The compound seal 105 supports the shoe 87, on which the head 85 is fixed, to locate the magnetic gap 91 of the head at the elongate opening 97, in substantially coplanar relation with the air bearing surface 95. As shown in FIGS. 4, 5 and 7, the stabilizer block 93 is supported for radial movement with respect to the disk 3 along a flat inclined surface 107 of a wedge-shaped support 109. A channel-like opening 111 in the support 109 is provided for the shoe 87 and the compound seal 105, which extend beyond the undersurface of the stabilizer block 93.

Figure 8:
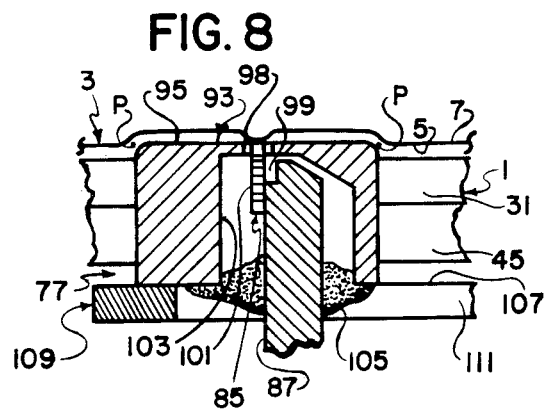
FIG. 8 is a sectional view of the stabilizing unit (received in the access opening in the disk cartridge) as seen in the direction of the arrows from the lines 8—8 in FIG. 6.

When the stabilizer block 93 is received in the pair of registered openings 31 and 45 in the envelope 21 and the housing 35 of the cartridge 1, to position the air bearing surface 95 and the head gap 91 adjacent the magnetic surface 5 of the disk 3, the wedge-shaped support 109 limits penetration of the leading curved edge 96 of the air bearing surface to slightly (e.g., 0.001"–0.004") into the nominal plane P of the disk, as shown in FIG. 7. Moreover, the wedge-shaped support 109 locates the trailing curved edge 97 of the air bearing surface 95 slightly spaced from the nominal plane P of the disk 3. As a result, the air bearing surface 95 is disposed at a negative angle of attack (e.g., $-1.5°$) with respect to the nominal plane P of the disk 3, as shown in FIG. 5. Rotation of the disk 3 in the direction R at a relatively fast speed (e.g., 60 revolutions per second) to move successive portions of the disk over the air bearing surface 95 will cause the leading edge 96 of the air bearing surface 95 to operate as air scraper means. Such means chokes off the flow of moving air over the air bearing surface and thereby causes the formation of a Bernoulli pull down force along the surface, which deflects the disk 3 from its nominal plane P, as shown in FIG. 7. In addition, as successive portions of the disk 3 move over the elongate opening 98 to the cavity 99, air will be removed from the cavity, causing the formation of a negative or low pressure in the cavity. The negative pressure generates a pull down force on each portion of the rotated disk 3 as such portion is moved over the elongate opening 98, which will momentarily deflect that portion lightly into contact with the head gap 91 and a small area of the operating surface 89 adjacent the head gap, as shown in FIGS. 7 and 8. The air bearing surface 95 stabilizes each portion of the rotated disk 3 by damping out any flutter before the negative pressure at the elongate opening 98 pulls such portion into contact with the head gap 91, thereby ensuring a stable and intimate head-to-disk magnetic coupling.

When the air bearing surface 95 is disposed at a negative attack angle, as shown in FIG. 7, the Bernoulli pull down force formed along the air bearing surface has been found to enhance disk stabilization along the surface and to enhance disk pull down over the elongate opening 98 to the cavity 99. Specifically, the resulting pull down force causes the rotated disk 3 to move closer to the air bearing surface 95, which improves stabilization of successive portions of the rotated disk before each portion contacts the head gap 91. Moreover, the negative or low pressure in the cavity 99 is slightly increased to provide improved transducer-to-disk contact.

Figure 9:
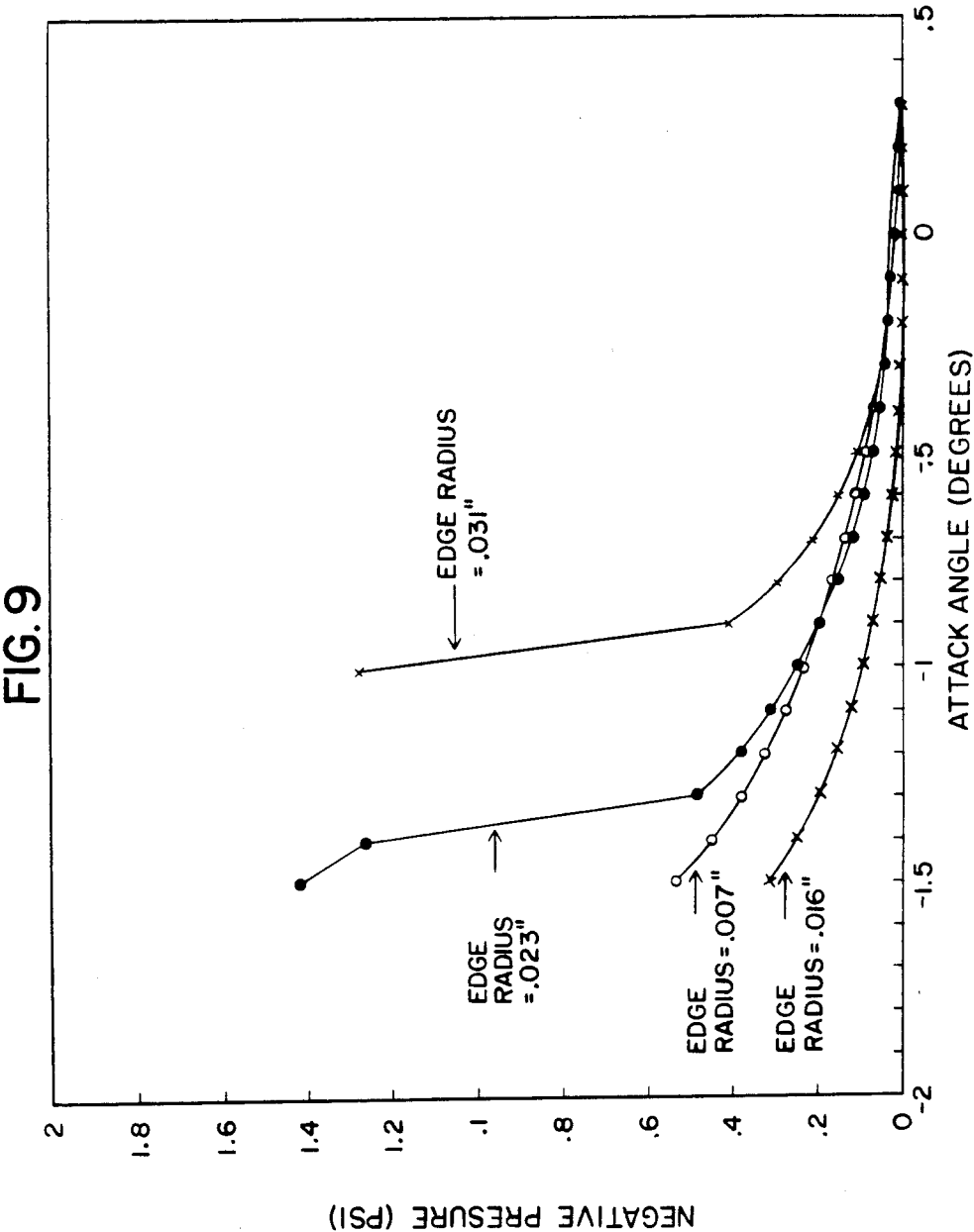
FIG. 9 is a graph of the angle of attack of the head-to-disk stabilizing unit vs. the negative pressure in a cavity (containing the magnetic head) in such unit, showing respective curves for various edge radi of a leading curved edge of the unit.

FIG. 9 is a graph of the negative attack angle of the air bearing surface 95 vs. the negative pressure in the cavity 99, showing respective curves for various edge radii of the leading curved edge 96 of the air bearing surface. In the illustrated embodiment of the head-to-disk stabilizing unit 77, a preferred range of the negative pressure in the cavity 99 is about 0.1 psi–0.6 psi. Thus, an examination of the respective curves will indicate that an edge radius of the leading edge 96 within the range 0.007"–0.016" is preferable to an edge radius of 0.023" or 0.031".

The elongate opening 98 to the cavity 99 has a length $L_{98}$ that is long in proportion to its width $W_{98}$ in a direction tangential to the direction R of rotating the disk 3, as shown in FIG. 6, and preferably has a wasp waist or hourglass configuration with a narrow waist 113 disposed proximate the head gap 91, to limit pull down deformation of the rotated disk in the vicinity of the head gap and to effect the greatest stabilization of the disk (by the air bearing surface 95) generally at the same location. The typical dimensions of the elongate opening 98 with a wasp waist configuration are as follows:

Length $L_{98}$ is 0.140";

Maximum width $W_{98}$ is 0.040"; and

Minimum width at narrow waist 107 is 0.030".

While the invention has been described with reference to a preferred embodiment, it will be understood that various modifications may be effected within the ordinary skill in the art without departing from the scope of the invention. For example, instead of containing either a record head or a playback head, the cavity 99 in the stabilizer block 93 might contain both of such heads or a single record/playback head to provide recording and reproducing capabilities. Moreover, instead of providing the wedge-shaped support 109 to dispose the air bearing surface 95 at a negative attack angle, the air bearing surface could itself be inclined at such angle.

I claim:

1. In a recording and/or reproducing apparatus of the type provided with (a) means for rotating a flexible storage disk and (b) a record and/or playback head having transducer means for coacting with the disk to record or reproduce information on the disk, the improvement comprising:

a substantially flat air bearing surface for stabilizing the flexible disk as it is rotated over said surface;

means, integral with said air bearing surface, defining a negative pressure cavity having an opening to said surface, for generating a pull down force on successive portions of the rotated disk as each portion is moved over said opening;

means supporting said head in said cavity with said transducer means at said opening; and means for disposing said air bearing surface at a negative attack angle with respect to the rotated disk for causing the formation of a pull down force along said surface to enhance disk stabilization over said surface and disk pull down at said opening, whereby a stable and intimate transducer-to-disk relation is effected.

2. The improvement as recited in claim 1, wherein said air bearing surface is disposed at a negative attack angle that is less than 1.5°.

3. The improvement as recited in claim 1, wherein said air bearing surface includes a leading curved edge located upstream with respect to the direction of rotating the disk to operate as air scraper means for reducing the flow of air over said air bearing surface and thereby cause the formation of a pull down force along said surface.

4. The improvement as recited in claim 3, wherein said leading edge of said air bearing surface slightly penetrates into the nominal plane of the rotated disk.

5. In a recording and/or reproducing apparatus of the type provided with (a) means for rotating a flexible storage disk and (b) a record and/or playback head having transducer means for coacting with the disk to record or reproduce information on the disk, the improvement comprising:

a substantially flat air bearing surface for stabilizing the flexible disk as it is rotated over said surface, said air bearing surface having a leading curved edge located upstream with respect to the direction of rotating the disk and a trailing curved edge located downstream from said leading edge;

means, integral with said air bearing surface, defining a negative pressure cavity having an opening to said surface, for generating a pull down force on successive portions of the rotated disk as each portion is moved over said opening;

means supporting said head in said cavity with said transducer means at said opening in substantially coplanar relation with said air bearing surface to contact successive portions of the rotated disk; and means for disposing said air bearing surface at a negative attack angle with respect to the rotated disk, with said leading edge slightly penetrating into the nominal plane of the rotated disk and said trailing edge spaced from the nominal plane, for causing the formation of a pull down force along said air bearing surface to enhance disk stabilization over said surface and disk pull down at said opening, whereby a stable and intimate transducer-to-disk relation is effected.

* * * * *